A. H. E. BECKMAN.
SKEE STOPPER.
APPLICATION FILED JULY 1, 1921.

1,401,940.

Patented Dec. 27, 1921.
2 SHEETS—SHEET 1.

Inventor—
Albert Henning Efraim Beckman,
By - B. Singer,
Atty.

A. H. E. BECKMAN.
SKEE STOPPER.
APPLICATION FILED JULY 1, 1921.

1,401,940.  Patented Dec. 27, 1921.
2 SHEETS—SHEET 2.

Inventor
Albert Henning Efraim Beckman,
By B. Singer
Atty.

UNITED STATES PATENT OFFICE.

ALBERT HENNING EFRAIM BECKMAN, OF STOCKHOLM, SWEDEN.

SKEE-STOPPER.

1,401,940. Specification of Letters Patent. Patented Dec. 27, 1921.

Application filed July 1, 1921. Serial No. 481,998.

*To all whom it may concern:*

Be it known that I, ALBERT HENNING EFRAIM BECKMAN, a subject of the King of Sweden, and a resident of Vasagatan 5, in the city of Stockholm, Sweden, have invented an Improved Skee - Stopper, (for which I have filed application for Letters Patent of Sweden, March 24, 1919, No. 1,366, and May 14, 1921, No. 1,997,) of which the following is a specification.

The invention relates to skee-stoppers, which are intended to prevent backward sliding of the skees.

My improved skee-stopper consists of a pivoted rearwardly directed arm which slides on the ground (snow or ice) when the skee is moved forward and is adapted to enter the ground when the skee begins to slide backward, means being provided to limit the up and down swinging movements of said arm and to easily remove it when its use is not wanted and quickly replace it whenever desired and to prevent undesired removal when in use.

In the drawing—

Figure 1:
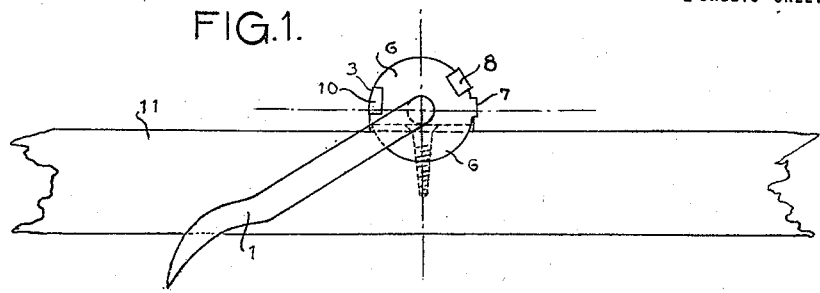
Figure 1 is a side elevation of the middle portion of a skee with the stopper mounted thereon.
Figure 2:
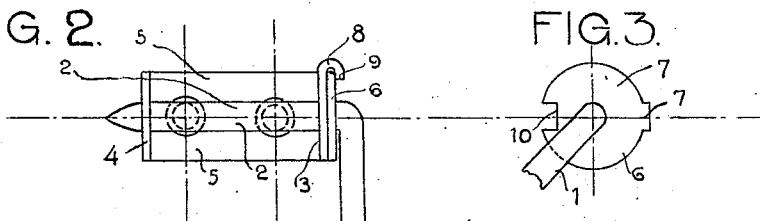
Fig. 2 is a plan view of the stopper and the bearing for its pivot.
Figure 3:
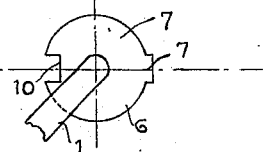
Fig. 3 is a side view of the stopper removed from the bearing.
Figure 4:
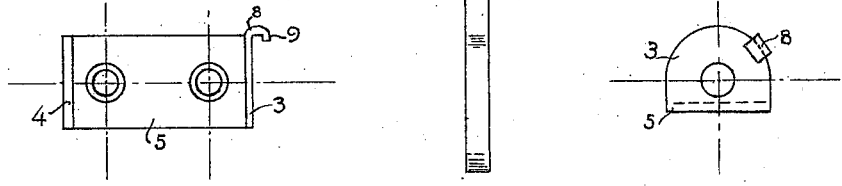
Figs. 4 and 5 are plan view and side view of the bearing.
Figure 5:
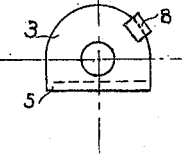

Referring to Figs. 1–5 and 9 the stopper consists of an arm 1 extending rearward at the outer side edge of the skee and bent to a right angle at the fore-end so as to form a pivot 2 which is passed through lugs 3, 4 of a bearing piece 5 fixed to the upper side of the skee by screws or otherwise so that the arm 1 is adapted to swing up and down. When the skee is moved forward the arm will slide on the snow or ice and not hinder the movement but if the skee tends to slide backward the pointed or flattened sharp rear end of the arm will at once grasp or penetrate the ice or snow and will be locked in this grasping position so as to stop or prevent further backward movement of the skee. For this purpose a collar 6 is fixed on the pivot 2 adjacent to the outer lug 3, and this collar has a tooth 7 which engages an outwardly bent tongue 8 on the lug. The free end of the tongue is further bent down on the outside of the collar as shown at 9 (Fig. 2) so as to prevent undesired withdrawal of the pivot from the lugs. A notch 10 on the collar diametrically opposite the tooth 7 allows such withdrawal when the arm is swung upward so far that this notch coincides with the tongue.

Figure 6:
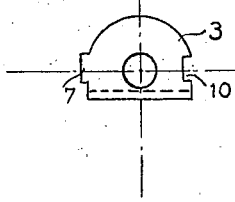
Figs. 6, 7 and 8 show a modification.
Figure 7:
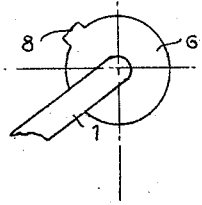
Figure 8:
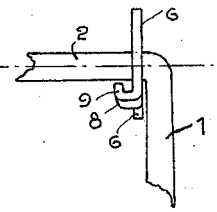
Figure 9:
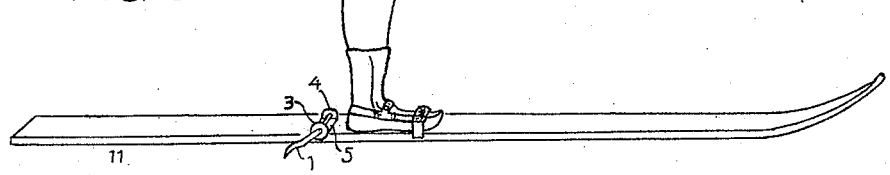
Fig. 9 is a perspective view of the skee showing the stopper mounted thereon.

Figs. 6–8 show that the tooth 7 and notch 10 may be on the lug 3 and the tongue 8—9 on the collar 6, if preferred.

When assembling the parts the pivot is inserted in the lugs as far as the tongue allows and then rotated until the notch reaches the tongue and allows the full insertion of the pivot. Then the arm 1 should be allowed to swing down so as to bring the notch from the position of coincidence with the tongue.

Figure 10:
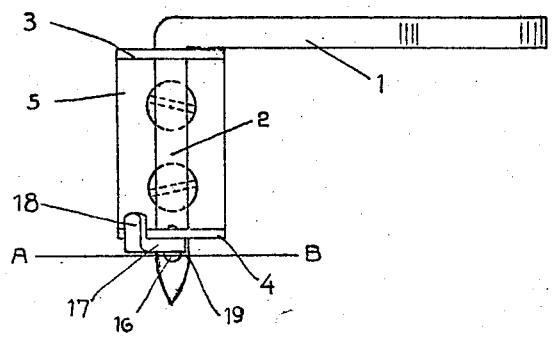
Figs. 10 and 11 are plan view and side view of a modification.
Figure 11:
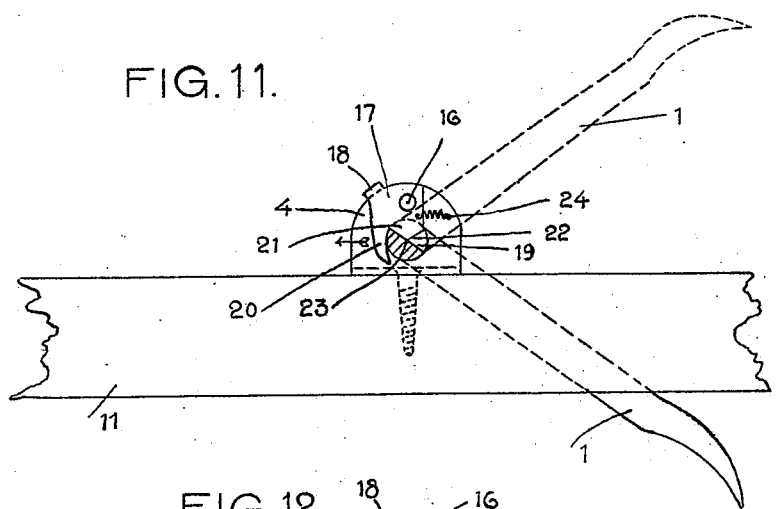
Figure 12:
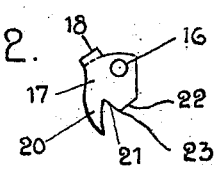
Fig. 12 is side view of a detail of same.

In the modification shown in Figs. 10–12 the collar 7 is dispensed with and substituted by a locking plate 17 pivoted at 16 to one of the lugs for instance the lug 4 and adapted to engage a transverse slot 19 on the pivot 2.

This slot 19 reaches the center of the pivot 2 and has a straight bottom which concurs with a diameter of the pivot.

The plate 17 is preferably pivoted eccentrically with regard to its center of gravity so that it tends to turn counter-clockwise in Fig. 12. The turning is limited by a tongue 18 provided at the upper left corner of the plate and bent over the edge of the lug 4, or by a tail 20 at the lower left corner of the plate which tail rests on the left side of the pivot 2.

The pivot of the plate 17 is situated above the pivot 2 of the arm 1, and the lower edge of the plate adjacent to the tail 10 is angular or pointed as shown, *id est* has two edges 21, 22 which form an angle of about 90° with each other.

When the tail 10 rests on the left side of the pivot 2, the point 23 where the two edges meet will be at the counter of the pivot within the slot. When the arm 1 is in its lower or working position (with its point forced down in the snow) the edge 21 coacts with the left half of the bottom of the slot and prevents further downward turning of the arm 1. When the arm is raised to the position shown by dotted lines in Fig. 11, the other edge 22 of the plate 17 engages the other half of the bottom of the slot and prevents further upward movement of the arm. For withdrawing the pivot 2 from the lugs or for inserting it in the same the arm 1 should be turned upward about to horizontal position and while the arm is in such position the plate 17 should be turned clockwise by lifting the tongue 18 (by means of a finger) so as to disengage the plate from the slot. Then the pivot 2 can be removed or inserted.

Though the plate 17 is automatically held in the engaged position by its weight, a spring 24 may be used for that purpose, if preferred.

Figure 13:
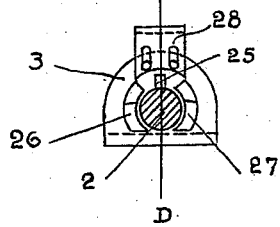
Figs. 13 and 14 are views (partly sectional) of another modification.
Figure 14:
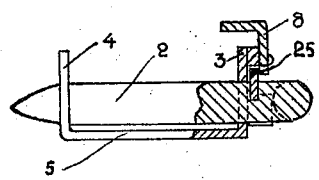

The forms now described are the preferred ones. I do not wish, however, to be limited to these forms as others based on the same principle may be used. So for instance the collar 6 may be substituted by a radial stud 25 (Figs. 13, 14) on the pivot 2 which is adapted to engage two projections 26, 27 on the outside of the lug 3 so as to limit the swinging of the arm 1. And the pivoted locking plate 17 may be substituted by a bolt or plate 28 (Figs. 13, 14) slidable up and down in or on guides on said lug 3. In its lower position this bolt reaches the pivot 2 in front of the stud 25 so that the pivot 2 can not move endwise out of the lugs before the bolt 28 is pulled upward to the position shown so as to clear the passage of the stud.

The stopper on the right skee is preferably placed at the right edge of the skee, and the stopper on the left skee at the left edge of the skee. The drawings show a right-skee stopper.

What I claim is:

1. A stopper for skees consisting of a rearwardly directed up and down swingable arm with an integral pivot passed through a lug on the skee, said lug and said pivot having coöperating means for limiting the swinging movement of the arm and for preventing undesired withdrawal of the pivot.

2. A stopper for skees consisting of a rearwardly directed up and down swingable arm with integral pivot passed through a lug on the skee and a locking plate pivoted on said lug and adapted to engage a transverse slot on the pivot so as to limit the swinging of the arm and prevent undesired withdrawal of the pivot from the lug.

3. A stopper for skees consisting of a rearwardly directed up and down swingable arm with integral pivot passed through a lug on the skee and a locking plate pivoted to said lug, said plate having two oblique edges which are adapted to engage a transverse slot in the pivot, one of the edges being adapted to limit the downward and the other the upward movement of the arm while both are adapted to prevent undesired withdrawal of the pivot from the lug and means for keeping the plate in coöperation with the slot.

4. A stopper for skees consisting of a rearwardly directed up and down swingable arm with integral pivot passed through lugs on the skee and a locking plate pivoted to one of the lugs, a tail on the plate adapted to engage the side of the pivot so as to limit the movement of the plate, edges on the plate adapted to engage a transverse slot on the pivot so as to prevent undesired withdrawal of said pivot from the lugs, said edges being adapted to coöperate with the bottom of said slot for limiting the swinging movements of the arm.

ALBERT HENNING EFRAIM BECKMAN.

Witnesses:
NILS LUNDBORG,
S. ERICSSON.